J. A. HIRST.
HOG CRATE.
APPLICATION FILED JULY 11, 1917.

1,263,246.

Patented Apr. 16, 1918.

WITNESSES
W. C. Fielding

INVENTOR
John A. Hirst
BY Richard Bowen
ATTORNEY

UNITED STATES PATENT OFFICE.

JOHN A. HIRST, OF BEEVILLE, TEXAS, ASSIGNOR OF ONE-HALF TO SAMUEL L. HIRST, OF BEEVILLE, TEXAS.

HOG-CRATE.

1,263,246.     Specification of Letters Patent.      Patented Apr. 16, 1918.

Application filed July 11, 1917. Serial No. 179,909.

*To all whom it may concern:*

Be it known that I, JOHN A. HIRST, a citizen of the United States, residing at Beeville, in the county of Bee and State of Texas, have invented certain new and useful Improvements in Hog-Crates, of which the following is a specification.

This invention has relation to animal crates, and has for an object to provide a crate especially designed to contain hogs, or pigs on the hoof, for shipping purposes, and containing openings through which the legs of the animal may project whereby the animal may walk about while contained within the crate thereby permitting and maintaining separation of the animals for identification, and other purposes.

In addition to the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:—

With reference to the drawings, 10 indicates substantially circular end members connected by means of circumferentially spaced slats 11 which may retain the end members in properly spaced relation.

Figure 2:
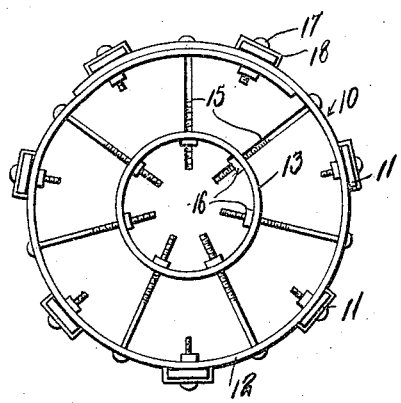
Fig. 2, is a view of the crate in end elevation.
Figure 3:
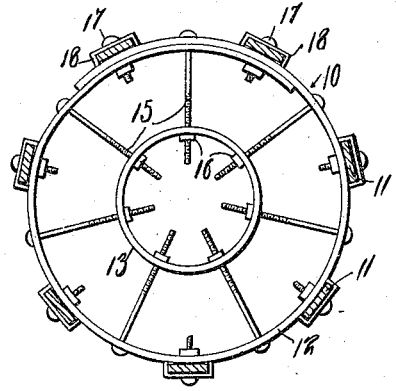
Fig. 3, is a view of the crate in section taken on the line 3—3 of Fig. 1.

Each end member is a duplicate of the other and comprises a strip of material 12 bent to circular form with its ends in overlapping engagement to form a circle as shown in Figs. 2 and 3. A concentric inner circular member 13 is provided for maintaining the circular configuration of the strip. The strip is provided with a plurality of longitudinally spaced openings 14 through which radially disposed bolts 15 extend, the heads thereof engaging the outer sides of the strip and their inner ends in openings provided in concentric annular member 13, nuts 16 being applied to the inner ends of the bolts as indicated whereby the nuts may be tightened uniformly, the concentric circular member 13 adjusted in a central position within the outer strip 12 and said strip maintained in its circular configuration.

The slats 11 are connected to the strips 12 of the end-members, by means of bolts 17 which enter openings in the strips and openings in the end of the slats. As a reinforcement a strip of metal 18 may be bent transversely around each end of each slat with an opening for registration with the openings of the slats through which the bolts 17 may project.

Figure 1:
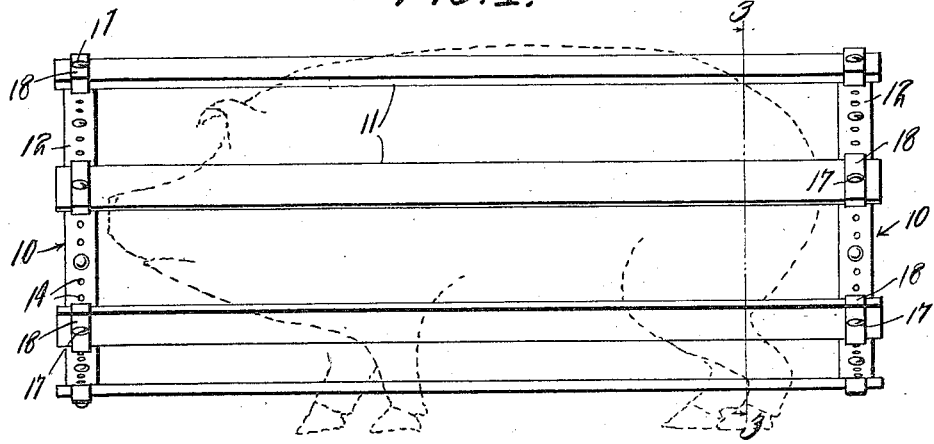
Figure 1, is a view in side elevation of a crate for the purpose described constructed in accordance with my invention.

From Fig. 1 it will be seen that when the animal is disposed within the crate its legs may project between the slats and the animal may therefore walk about while contained within the crate. This device is therefore especially desirable to animal breeders as a means of separating the animals, when they are sent to pasture, for purposes of identification and to control breeding.

Figure 4:
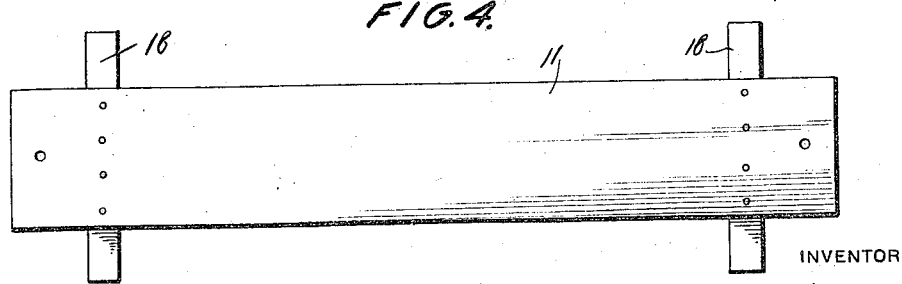
Fig. 4, is a detail view in elevation of one of the slats of the crate.

The crate may be easily embraced about the animal by separating the ends of the strips 12 which will permit the crate to be laid out flat, and then wrapped around the animal, redisposing the ends of the strips in overlapping relation and connecting the same. Other purposes and advantages will be apparent to persons acquainted with the art to which this invention pertains. The slat shown in Fig. 4 is exceptionally broad as compared to the slats forming a part of the crate, and is used when a hog is shipped within the crate. One of the slats in the crate is removed, the diameter of the crate increased and the slat shown in Fig. 4 substituted in place of the slat removed thereby providing a broad surface upon which the hog can stand without permitting its feet to project between slats.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention or the scope of the appended claims.

Having thus described my invention what I claim as new and desire to secure by Letters Patent is:—

1. An animal crate including end members, each comprising a strip bent to circular formation, concentric annular members disposed within the end members, bolts connecting the end members to said annular members, and slats circumferentially spaced and connected at their ends to the end members to retain the same in spaced relation.

2. An animal crate of cylindrical configuration, divided longitudinally and having its divided edges disposed in overlapping engagement whereby the diameter of the crate may be varied by increasing or decreasing the amount of lap, means for connecting the overlapping edges and means adjustable to close the ends of the crate in any adjusted diameter thereof.

3. An animal crate adjustable in diameter including end members bent to circular formation and having their ends in overlapping engagement whereby the diameter of the members may be varied by increasing or decreasing the amount of lap, means for connecting together the ends of the strips subsequent to adjustment, a plurality of slats serving to connect said members and members movable radially at the ends of the crate as the diameter thereof is varied to close said ends.

In testimony whereof I affix my signature in presence of two witnesses.

JOHN A. HIRST.

Witnesses:
W. R. STOUT,
W. G. GAYLE.

Copies of this patent may be obtained for five cents each, by addressing the "Commissioner of Patents, Washington, D. C."